Dec. 7, 1926.

A. C. ANDERSEN 1,609,281

CLUTCH

Filed April 17, 1926  2 Sheets-Sheet 1

INVENTOR.
Andrew Christian
BY  Andersen
Stuart Barnes
ATTORNEY.

Dec. 7, 1926.  
A. C. ANDERSEN  
1,609,281  
CLUTCH  
Filed April 17, 1926   2 Sheets-Sheet 2
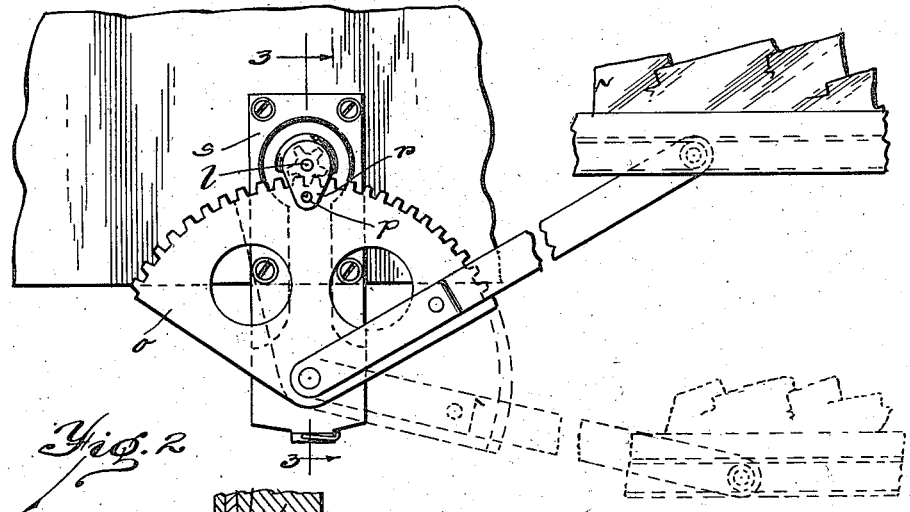
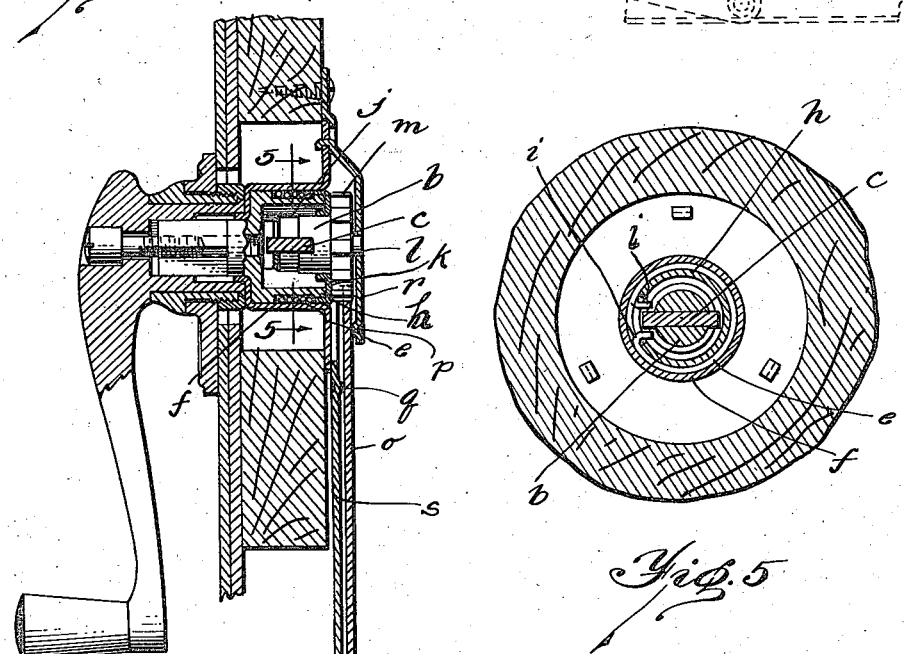
INVENTOR.
Andrew Christian Andersen
BY
Stuart C. Barnes
ATTORNEY.

Patented Dec. 7, 1926.

1,609,281

UNITED STATES PATENT OFFICE.

ANDREW CHRISTIAN ANDERSEN, OF DETROIT, MICHIGAN, ASSIGNOR TO TERNSTEDT MANUFACTURING COMPANY, OF DETROIT, MICHIGAN, A CORPORATION OF MICHIGAN.

CLUTCH.

Application filed April 17, 1926. Serial No. 102,638.

This invention relates to window regulator clutches, and has for its object an improved clutch in which the driving and driven parts are fitted together and in the clutch housing so that one has two separated bearings in the housing and the other two separated, one in a journal cup mounted on the other clutch member, so that the sleeving of the driving member over the driven member is wholly unnecessary. This design of the clutch is particularly desirable in a coil spring clutch that expands against a braking drum on the interior of the clutch casing. In such clutches as have heretofore been designed it has been proposed to support the driven member within the driving member in a sleeved arrangement at the center of the clutch. However, by reason of each of the clutch members having only one other bearing and the sleeving being slotted and affording a very small bearing, this arrangement is not calculated to successfully prevent the tilting of the clutch members with respect to the other in the space left to contain the coil spring. I have overcome this difficulty by the design of my clutch which successfully prevents any tilting or cocking in the bearings, and eliminates the necessity of the sleeving arrangement.

Referring to the drawings:

Fig. 2 is a fragmentary view of the lockboard equipped with the regulator containing my improved clutch.

Fig. 3 is a vertical section on the line 3—3 of Fig. 2.

Fig. 5 is a cross section on the line 5—5 of Fig. 3.

This clutch can be used in any type of regulator, or for that matter, in any form of lift or motion transmitting device which requires irreversible driving relation. Clutches of this kind are not broadly new, and it is not broadly new to utilize a clutch with a casing, the inside of which forms a brake drum and a coil spring which is expanded into braking relation with the drum.

In this application $a$ designates the driving member, $b$ the interfitting driven member provided with a key $c$. A coil spring $c$ fits over the driving member and fits closely in the brake drum or cup $f$. Driving effort coming through the slotted driving shell $h$ picks up either one or the other of the inturned hooks $i$ of the coil spring, and this tends to contract the spring in a familiar way which has long been old in this type of clutch. On the other hand, driving effort coming through the driven member is communicated by the key $c$ to the hook ends of the coil spring and in a way that has long been known in the art, tends to expand the spring by turning effort in either direction. This expansion causes the spring to expand and grip the brake drum.

It is the object of the present invention to so design the interfitting driving and driven members that they get a reliable bearing not only with respect to the amount of the journal bearing, but also by the proper location of the bearings with respect to each other. It has been proposed in the prior art to sleeve the driving member directly over the driven member. The trouble with this construction is that the driving member has only a bearing in the housing at one end of the clutch, while the other end of the clutch of the driving member projects unsupported into the clutch housing, except in so far as it can find the proper centering influence by being enclosed in the coil spring. In actual practice it has been found that such a set-up of the bearings does not keep the two clutch members properly aligned and centered in the clutch housing. It is desirable for the driven member to have a large bearing on the inside of the brake drum as well as the driving member. It is also desirable to have for the driven member two separated bearings, one on each side of the member which transmits the load, which, I believe, is a new thing in clutches of this kind.

Figure 1:
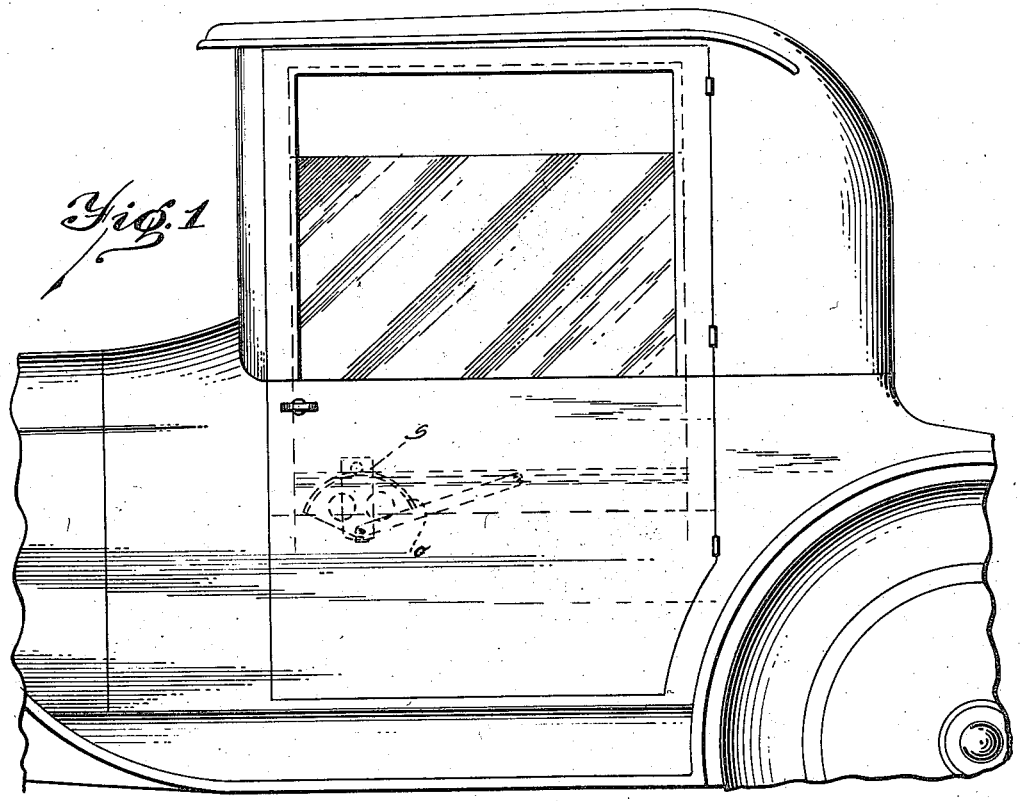
Fig. 1 shows an automobile equipped with a regulator containing my improved clutch.
Figure 4:
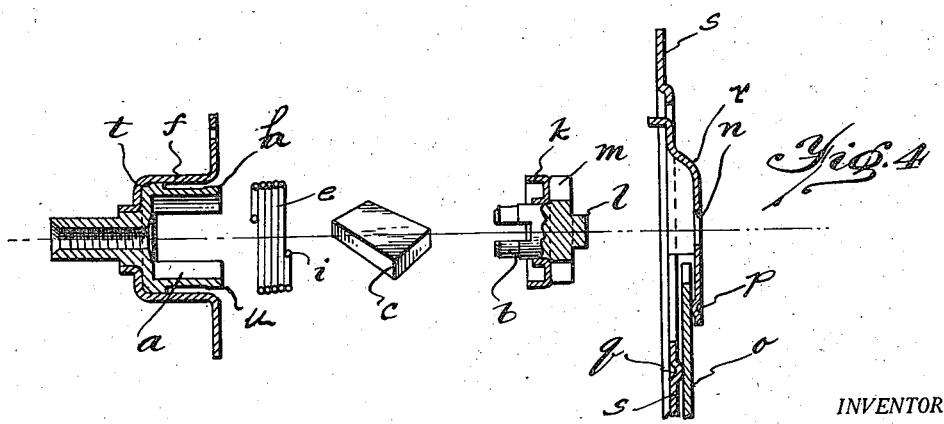
Fig. 4 is a composite view largely in section showing all the parts assembled together, and how they look separately.

Applying the principles that I have laid down as being desirable these are carried out in my construction by the special design of the driven member. My clutch has a driving member that is not sleeved over the driven member. They simply overlap and preferably a considerable clearance is provided as at $j$. However, this space is not necessary. A cup $k$, preferably of brass, is fitted over the screw machine product which forms the driven member $b$. This cup has a pressed fit on this screw machine stud. The driven member is formed into a driving pinion $m$ which is effected by the operations that make the screw machine product, while on the other side of the driving pin is a stud portion $l$. This stud portion is fitted into the journal bearing hole $n$ in the offset tongue $r$ of the regulator plate $s$. This offset tongue I consider part of the clutch housing and is arranged to bear against the large gear segment $o$ and hold it tightly up against the regulator plate $s$, as is shown in Fig. 4. Preferably punched out portions $p$ and $q$ furnish the bearing surfaces and thereby cut down the friction. This tongue arrangement forms a very useful anti-rattling and guiding device to keep the teeth of the gear segments to mesh with the teeth of the driving pinion $m$. However, this is not claimed in the present application, but is the subject of a separate application of Messrs. Heintz and Archer, Serial No. 722,659.

It will be apparent from the above description that the driven member of the clutch has two separate bearings, one of which is afforded by the journal stud $l$ in the offset tongue $r$ of the regulator plate, and the other the brake-drum journaling cup $k$. So far as I am advised in the prior art it has been customary to give the driven member only one bearing in one of the stationary members, and then rely upon sleeving the driving member over the driven member to prevent the likely misalignment. This in practice is not achieved, for the reason that the driving member has suitable support only at one end and is free to move into an eccentric position in the clearance space for the coil spring. The small bearing afforded at the center by sleeving the driving member over the driven member is not large enough, long enough and accurate enough to prevent the driven member from sliding along the driving member and permitting the two to tilt somewhat. This tilting action often results in the jamming of one of the parts so that the clutch will not turn.

In my improved construction this sleeving of the driving member over the driven member is wholly unnecessary. The journal cup $k$ gives the driven member a direct bearing in the interior of the brake drum and a bearing of large surface because of its diameter. This cup affords, therefore, a second bearing for the driven member, and inasmuch as these two separated bearings are on opposite sides of the driving pinion $m$ which bears the load, it will be apparent that this driven member cannot very well be cocked in its bearings. The driving member is given a full bearing at $t$ in the brake drum. Its free end $u$ is provided with a slightly raised surface over which the coiled spring may be easily assembled, and which finds a full journal bearing on the inside of the journal cup $k$ of the driven member. Inasmuch as the driven member, as already explained, has two separate bearings in the stationary parts of the clutch housing at somewhat widely separated points, it will be obvious that the bearings for the end of the driving member is as secure as if it were in the housing itself for the driven member cannot tilt with these two widely spaced bearings, especially where the load is carried between the two bearings of the driven member, to wit: on the driving pinion.

This design of clutch forms a very reliable clutch with no tendency of the clutch parts in any way to cramp, due to misalignment. It is a much more reliable clutch than where the driving member and the driven member each have only one bearing, and the two are then sleeved together at the middle of the clutch to give a second bearing to each of the clutch parts. As already explained, the trouble here is that this sleeved bearing at the middle cannot be so made as to prevent same longitudinally sliding between the two clutch parts, in which case either one can nicely fulcrum on its single bearing, and thereby resulting in the cocking of the rotating parts and their cramping in the clutch cup. In my construction a different principle is carried out, and no sleeving of the parts together is necessary, although this may be used, but it will have no real function because unnecessary. Either one of the clutch parts is made a two bearing proposition with the bearings at considerably spaced points. This gives such part a permanently centered relation. The other clutch part is then made with one bearing at one end and a second journal bearing within the other clutch part. It will readily be seen that there can be no fulcruming of one clutch part on one bearing so as to throw the whole assembly out of line.

What I claim is:

1. In a clutch, a housing, a clutch member having two permanent journal bearings in the housing structure itself at somewhat spaced points to prevent tilting, a second clutch member having two bearings at somewhat spaced points and arranged in an interengaging relation with the first clutch part, and to have a limited rotating movement with respect to the first clutch part, and a single coil spring effecting a locking by relative movement in either direction due to driving effort coming through one clutch part, but permitting free movement in either direction by effort coming through the other clutch part.

2. In a clutch, the combination of a driven member, a housing in the structure of which the driven member has two separated bearings, a second clutch part having one bearing in the housing and a second separated bearing within the first mentioned clutch part, the two clutch parts arranged to have a limited relative movement and means brought into locking relation by relative movement due to the force coming through one clutch part, but permitting a free movement where the relative movement is caused by a force coming through the other clutch part.

3. In a clutch, the combination of a housing, a driven member having two bearings in stationary parts of the housing at spaced points along the axis of the driven member, and a driving member interfitting with the driven member, and having one bearing in the housing and a second bearing within the driven member at a spaced point along the axis of the driving member, and means locking against movement by relative movement between the two clutch members coming through one of them, but permitting free rotation by relative movement coming through the other clutch part.

4. In a clutch, the combination of a housing, a driven member including a load transmitting member having two bearings in the housing on opposite sides of the load transmitting member, a driving member having one bearing in the housing and a second spaced bearing in the driven member, the said parts being arranged to effect locking when driving effort comes through one of the clutch parts, and permitting free movement when driving effort comes through the other clutch part.

5. In a clutch, the combination of a housing, a driving member supported rotatably in the housing, and a driven member including a driving pinion supported in the housing by two separated bearings, one on each side of the driving pinion, and having an interfitting relation with the driving member, and means whereby driving effort coming through the driven member effects a locking of the clutch parts and driving effort coming through the driving member permits the parts to rotate freely.

6. In a clutch, the combination of a housing, a driving member rotatably supported therein, a driven member having interfitting relation with the driving member, and provided with a load transmitting member, and having two separated bearings in the housing, one on each side of the load transmitting member, and one of the bearings being in the form of a journal cup.

7. In a clutch, the combination of a housing, a driving member rotatably supported in the housing, a driven member rotatably supported in the housing by two separated bearings, one including a journaled cup that engages the inside of the housing, the said driving member having one bearing in the housing and a second separated bearing on the inside of the journal cup, the clutch parts operating to effect a locking when driving effort comes through one clutch member and to permit free turning movement when driving effort comes through the other clutch member.

8. In a clutch, the combination of a regulator plate, a clutch housing comprising an offset tongue on the regulator plate and a clutch cup secured to the other side of the regulator plate, clutch parts contained within the housing and including a clutch member which has two axially separated clutch bearings, one in the clutch cup and the other in the offset tongue.

9. In a clutch, the combination of a regulator plate, a clutch housing comprising an offset tongue on the regulator plate, and a clutch cup secured to the other side of the regulator plate, clutch parts contained within the housing, and including a clutch member which has two axially separated bearings, one in the clutch cup and the other in the offset tongue, and a load transferring member carried on such clutch part between the two separated bearings.

10. In a clutch, the combination of a regulator plate, a clutch housing comprising an offset tongue on the regulator plate and a clutch cup secured to the other side of the regulator plate, clutch parts contained within the housing and including a clutch member which has two axially separated clutch bearings, one in the clutch cup and the other in the offset tongue, and a driving pinion carried on said clutch part between the two separated bearings.

11. In a clutch, the combination of a regulator plate having an offset tongue on one side, a clutch cup secured to the other side, a pair of interfitting clutch members contained within the cup and including a coil spring arranged to be expanded in engagement with the cup as a brake drum, said two clutch parts each having two separated bearings, the separated bearings of one clutch part being in stationary members.

12. In a clutch, the combination of a regulator plate having an offset tongue on one side, a clutch cup secured to the other side, a pair of interfitting clutch members contained within the cup and including a coil spring arranged to be expanded in engagement with the cup as a brake drum, said two clutch parts each having two separated bearings, and a load transmitting member on the driven part located between the two separated bearings of such clutch part.

13. In a clutch, the combination of a regulator plate, an offset tongue on the regulator plate, a clutch cup secured to the other side of the regulator plate, clutch parts contained within the housing, and including a clutch member which has two axially separated clutch bearings, one in the clutch cup and the other in the offset tongue, a driving pinion located between the two bearings of the driven member and exposed through the opening that separates the offset tongue and the regulator plate.

In testimony whereof I have affixed my signature.

ANDREW CHRISTIAN ANDERSEN.